US010983760B2

(12) United States Patent
Guan

(10) Patent No.: US 10,983,760 B2
(45) Date of Patent: Apr. 20, 2021

(54) SOURCE CODE GENERATION FROM WEB-SOURCED SNIPPETS

(71) Applicant: Tao Guan, Toronto (CA)

(72) Inventor: Tao Guan, Toronto (CA)

( * ) Notice: Subject to any disclaimer, the term of this patent is extended or adjusted under 35 U.S.C. 154(b) by 0 days.

(21) Appl. No.: 16/793,182

(22) Filed: Feb. 18, 2020

(65) Prior Publication Data

US 2020/0293291 A1 Sep. 17, 2020

Related U.S. Application Data

(60) Provisional application No. 62/817,302, filed on Mar. 12, 2019.

(51) Int. Cl.
| | |
|---|---|
| *G06F 8/30* | (2018.01) |
| *G06F 8/41* | (2018.01) |
| *G06F 8/10* | (2018.01) |
| *G06F 17/15* | (2006.01) |
| *G06N 3/02* | (2006.01) |
| *G06N 5/00* | (2006.01) |
| *G06N 20/00* | (2019.01) |

(52) U.S. Cl.
CPC .................. *G06F 8/30* (2013.01); *G06F 8/10* (2013.01); *G06F 8/41* (2013.01); *G06F 17/15* (2013.01); *G06N 3/02* (2013.01); *G06N 5/003* (2013.01); *G06N 20/00* (2019.01)

(58) Field of Classification Search
None
See application file for complete search history.

(56) References Cited

U.S. PATENT DOCUMENTS

| 8,646,260 B2 * | 2/2014 | Chrisman ............... F01N 3/035 60/314 |
| 8,782,037 B1 * | 7/2014 | Barad ..................... G06F 16/81 707/723 |
| 10,873,596 B1 * | 12/2020 | Bourget ............. H04L 63/1483 |
| 2017/0300563 A1 * | 10/2017 | Kao ....................... G06F 16/345 |
| 2020/0097261 A1 * | 3/2020 | Smith .................. G06N 3/0454 |

* cited by examiner

*Primary Examiner* — Ryan D. Coyer

(57) ABSTRACT

The disclosure presents methods and apparatus that can be used to generate a software source code according to a user-provided specification based on example snippets searched from the Internet or a local database, comprising: providing a user-defined specification of the target program including input data, output data, a function or algorithm, and other parameters; decomposing the function into sub-functions if necessary; searching a list of related programming example codes and snippets of each sub-function; analyzing and ranking the search results; selecting and extracting the best snippet source codes; refactoring and reformatting the codes; gluing and testing the generated codes. The final source codes are supposed to be compiled successfully and implement the desired function and meet the performance requirements. Even the final compilation success is not guaranteed the described method and apparatus can help on a best-effort basis and reduce a great effort in programming.

20 Claims, 10 Drawing Sheets

Google Search on the Internet and local database: 402 python float list normalize between 0 and 1 and sort float array

Search Results: 404

Normalization - How to normalize data to 0-1 range? - Cross Validated https://stats.stackexchange.com/questions/70801/how-to-normalize-data-to-0-1-range

406

408

```
Example Data
x = sample(-100:100, 50)

#Normalized Data
normalized = (x-min(x))/(max(x)-min(x))

# Histogram of example data and normalized data
par(mfrow=c(1,2))
hist(x, breaks=10, xlab="Data", col="lightblue", main="")
hist(normalized, breaks=10, lab="Normalized", col="lightblue", main="")
```

Conlusion:

410

Could not find any result can do both normalization and sorting on a float array using python programming language.

Google Search 1:

python float list normalize between 0 and 1 — 502

Search Results: — 506

Normalization - How to normalize data to 0-1 range? - Cross Validated https://stats.stackexchange.com/questions/70801/how-to-normalize-data-to-0-1-range 508, 510

```
Example Data
x = sample(-100:100, 50)

#Normalized Data
normalized = (x-min(x))/(max(x)-min(x))

# Histogram of example data and normalized data
par(mfrow=c(1,2))
hist(x, breaks=10, xlab="Data", col="lightblue", main="")
hist(normalized, breaks=10, lab="Normalized", col="lightblue", main="")
```

(b)

Google Search 2:

python float list sort — 512

Search Results: — 516

Python how to sort list with float values - Stack Overflow — 518 https://stackoverflow.com/questions/37318637/python-how-to-sort-list-with-float-values

— 520

```
list1 = sorted(list1, key=float)
```

Fig. 5

Google Search: 502 python float list normalize between 0 and 1

Analyzing and ranking:

(a) 604

Search Result 2: (Ranked higher because it is closer to the query) 606

Normalization - How to normalize data to 0-1 range? - Cross Validated https://stats.stackexchange.com/questions/70801/how-to-normalize-data-to-0-1-range

608

(b)

Search Result 1:
616

Normalizing a list of numbers in Python - Stack Overflow https://stackoverflow.com/questions/26785354/normalizing-a-list-of-numbers-in-python

Selecting, extracting, and reformatting:

(a)

510

```
Example Data
x = sample(-100:100, 50)

#Normalized Data
normalized = (x-min(x))/(max(x)-min(x))

# Histogram of example data and normalized data
par(mfrow=c(1,2))
hist(x, breaks=10, xlab="Data", col="lightblue", main="")
hist(normalized, breaks=10, lab="Normalized", col="lightblue",
main="")
```

↓ Refactoring   702

```
#Normalized Data
normalized = (x-min(x))/(max(x)-min(x))
```

(b)

512

```
list1 = sorted(list1, key=float)
```

↓ Refactoring and reformatting   712

```
#Sorted Data
list1 = sorted(normalized, key=float)
```

Fig. 7

Gluing and connecting the codes:

802

```
# Input Data
x = sample(-100:100, 50)
```

702

```
#Normalized Data
normalized = (x-min(x))/(max(x)-min(x))
```

712

```
#Sorted Data
list1 = sorted(normalized, key=float)
```

806

```
# Output Data
par(mfrow=c(1,2))
hist(x, breaks=10, xlab="Data", col="lightblue", main="")
hist(list1, breaks=10, lab="Processed", col="lightblue", main="")
```

Compiled successfully and tested

Fig. 8

Output, indexing, archive the generated codes in the local database:

The tag of this piece of code  ⟵ 902

```
python float list normalize between 0 and 1 and sort float array
```

The new snippet  ⟵ 904

```
# Input Data
x = sample(-100:100, 50)

#Normalized Data
normalized = (x-min(x))/(max(x)-min(x))

#Sorted Data
list1 = sorted(normalized, key=float)

# Output Data
par(mfrow=c(1,2))
hist(x, breaks=10, xlab="Data", col="lightblue", main="")
hist(list1, breaks=10, lab="Processed", col="lightblue", main="")
```

Fig. 9

SOURCE CODE GENERATION FROM WEB-SOURCED SNIPPETS

CROSS-REFERENCE TO RELATED APPLICATION

This application claims the benefit of U.S. Provisional Patent Application No. 62/817,302, filed Mar. 12, 2019. The entire disclosure of the above application is incorporated herein by reference.

FIELD

The present disclosure is in the field of software, software engineering, software programming, Internet, search engines, databases, and text processing.

BACKGROUND

For a given software programming language, it has detailed references, specifications and examples of each function API, including syntax, parameter(s) required, return value(s), operation description, etc. However, this information is far from enough to guide a developer in composing a complete program for a given task, especially if the task is relatively complicated. Although there are a lot of code examples and snippets that can be collected from many channels and resources, it still requires great time and effort on the developers' part to search, collect, and digest code to produce a target program depending on their skills and experience.

Keeping up with the ever-evolving technologies in the software industry is becoming more and more difficult and pressuring. Popular program languages are evolving very quickly over time. For example, Fortran was once the most popular language for scientific and industry programming language; before being replaced soon after by C and C++. Now, the most widely used programming languages have become Python and a few web programming languages. Because of this issue, software development is becoming increasingly challenging, time-consuming, and difficult. It is also getting harder for software developers to gain enough experience.

Therefore, there is a need to automatically or semi-automatically generate the custom software program's source code based on the user's high-level requirements. The user only needs to define the input data and its data structure, the output data and its data structure, the software's desired functions or logic, and the miscellaneous configuration parameters like which program language is required, what the run-time performance is, and/or the dependent libraries for compilation.

A method that can automatically or semi-automatically generate the software is called software code generating. The corresponding system is called code generator. Existing code generators are limited in many ways. Many of them only generate to compiled software code instead of software source code, and only allow small deviations from the templates. They also do not store and use previously generated code that could be reused. As many programming models and algorithms are reusable, re-programming each of them again and again is a big waste of time and resources. Most of the existing source code generators can only generate code based on limited pre-defined code templates from local storage. None of the known code generating methods or generators use real-time Internet-sourced information, which may contain new data updated at the last second.

One of the useful Internet-sourced information is code snippets. In programming, a snippet is a small region of reusable source code, machine code, or text. Ordinarily, these are formally defined operative units to incorporate into larger programming modules. Code refactoring is the process of restructuring existing computer code, or changing the factoring, without changing its external behavior. It is intended to improve nonfunctional attributes of the software, such as enhancing code readability, maintainability, and extensibility. An Application Programming Interface (API) acts as a medium between two communicating entities or applications. It functions by sending some of the internal functions of the home application to a destination application. An API call is when an API is requested to fetch data from another application. Two snippets can each be refactored to meet the API requirements between them and combined to generate a piece of new code for an advanced function.

For any given task or problem, the high-level description can be split into four parts: input data, context or module logic, and output data, and configuration parameters. Input data refers to the initial data under processing. Context or module logic includes the main processing methods and functions. The output data is the expected final processed result. The configuration parameters could be language setups, run time environment, deployment requirements, etc.

The disclosure presents a novel method and system to offload developers' effort on programming language, by making use of existing code snippets and examples sourced from the Internet and a local code database to generate a software source code automatically or semi-automatically. The user only needs to define a high-level profile or requirements by providing a description of the input data, output data, function logic, and configuration parameters. The method and system present developers with either complete chained snippets woven together or chained snippet calls with added gluing codes in between. Each snippet may also have reference articles or usage examples explaining its principle and how it can be used. This provides developers with a quick and easy way to complete the basic programming code, which greatly shortens the overall software development time. The debugging process is also simplified, as the code snippets used usually have already tested and debugged. Since the snippets are collected from the Internet, which evolves organically with new technology, developers can easily stay up to date on new languages, algorithms, or programming methodologies.

SUMMARY

The disclosure presents novel methods and apparatus that can be used to automatically or semi-automatically generate custom software source code based on example programming snippets searched from the Internet or a local database. The general workflow is: a user defines a set of specifications of the target software program, including input data, output data, as well as their data structures, function or algorithm used to process the input data, the parameters like programming language related requirements and parameters, the software performance requirements like speed and memory limits, the software deployment related requirements like operating system, etc. After the software function has been decomposed and well defined into sub-functions, the method and apparatus start to search on the Internet to find a list of related programming examples and snippets for each sub-function. The list of snippets is then ranked according to the snippets' probabilities of achieving the best results. The best combination of snippets is chosen and integrated to form the final software source code. The glue codes are automatically or manually generated. The machine-learned general source code corrections or additions can be automatically generated, otherwise the user will need to manually correct things according to the collected online documentation. The final source code is supposed to be compileable and successfully achieve the desired functions. However, the final success is not guaranteed. The methods described in the present disclosure are on a best-effort basis. The generated codes, or called snippets, along with the documents, reference articles or usage examples explaining its principle and how it can be used, are stored in the local database for future searching and reusing.

BRIEF DESCRIPTION OF THE DRAWINGS

FIG. 4 illustrates an exemplary embodiment of the processing when a function cannot be fulfilled by any single searched snippet.

FIG. 5 illustrates an exemplary embodiment of the processing when a function can be fulfilled by two searched snippets.

FIG. 6 illustrates an exemplary embodiment of the analyzing and ranking of the searched snippets.

FIG. 7 illustrates an exemplary embodiment of the extracting and reformatting of the two searched snippets.

FIG. 8 illustrates an exemplary embodiment of the gluing and connecting of the two searched snippets.

FIG. 9 illustrates an exemplary embodiment of the archiving and indexing of the newly generated code into the local snippet database for further use.

DETAILED DESCRIPTION

Figure 1:
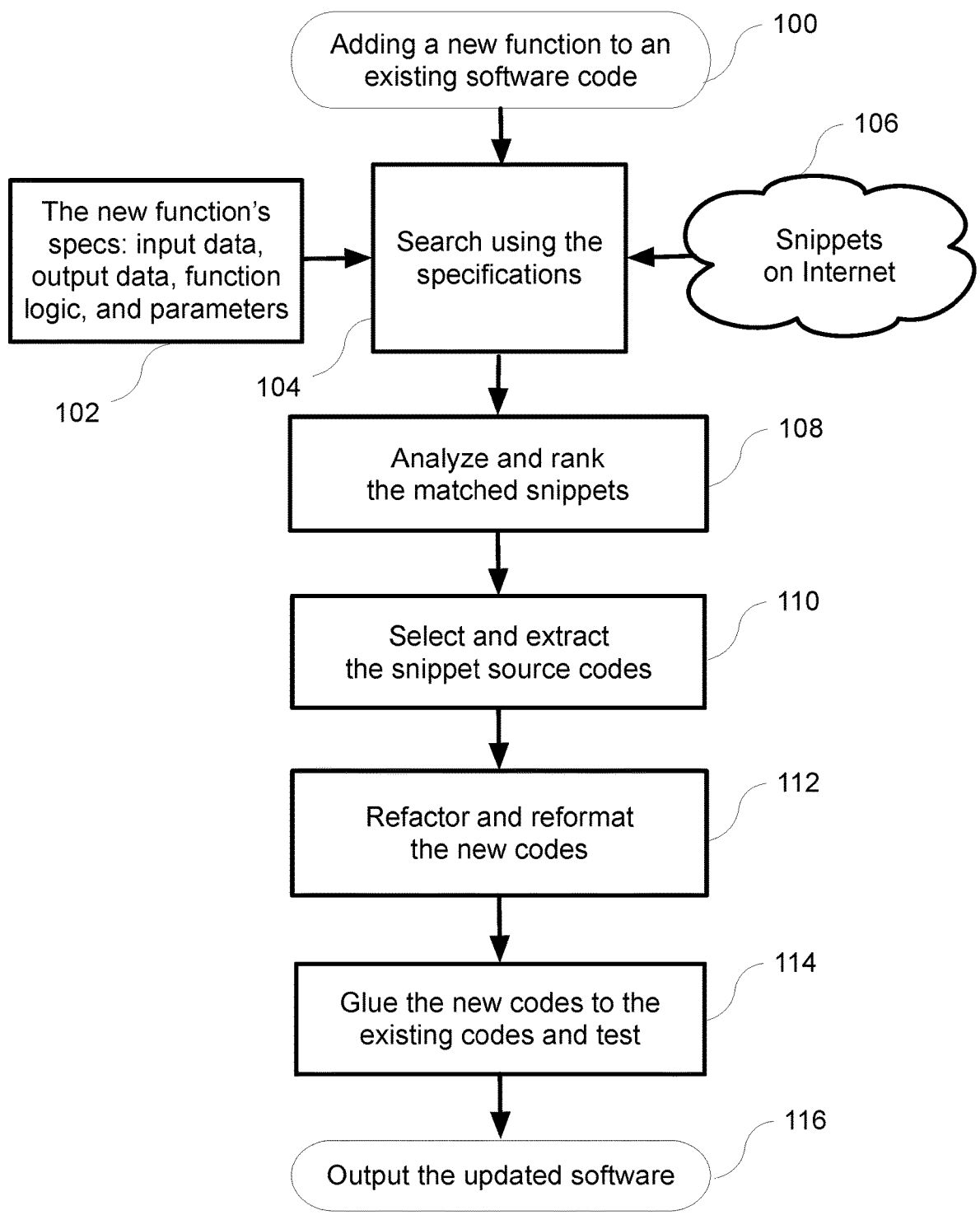
FIG. 1 illustrates a preferred embodiment of the overall method of the present disclosure.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The disclosure presents a set of methods and apparatus designed to generate source code using relevant snippets gathered from the Internet. The methods and accessory designs presented in this disclosure will serve for exemplary purposes but are not to be regarded as limited to these examples. The exemplary methods and accessory designs and all other possible variants obvious to the ordinarily skilled in the art are intended to take advantage of existing code snippets online to generate compileable and functional source code.

The general workflow is: a user defines a set of specifications of the target software program, including the input data and their structures, output data and their structures, the commonly known name of the function or algorithm used to process the input data, the programming language related requirements and parameters, the software performance requirements like speed and memory limits, the software deployment related requirements, etc. After the software function has been decomposed and well defined into sub-functions, the method and apparatus start to search on the Internet to find a list of related programming examples and snippets that are recognized to complete the same sub-functions. The list of snippets is then ranked according to the snippets' probabilities of achieving the best results if used. The best combination of snippets is chosen and merged together to form the final software source code. The glue codes are automatically or manually generated. The machine-learned general source code corrections or additions can be automatically generated, otherwise the user will need to manually correct things according to the collected online documentation. The final source code is supposed to be compileable and successfully achieve the desired functions. However, the final success is not guaranteed. The methods described in the present disclosure are on a best-effort basis.

FIG. 1 illustrates a preferred embodiment of the general workflow for the source code generation method of the present disclosure. More variants will be described in the following sections or figures. The specific embodiment described here is only for convenience in illustrating the basic idea of the invention but is not to be regarded as a limitation to the design options. This includes possible variants that are more elegant in design to achieve similar function purposes and variants with different ranking systems, presentation of search results, and refactoring/reformatting processes.

The source code generation method starts with the objective (100) of adding a new function to an existing source code base. In order to do so, an Internet search (104) must be made using the specifications (102). The user must provide a set of desired specifications (102) for the new function to be added.

The specifications (102) include, but are not limited to, input data, output data, function logic and its commonly used name, and software configuration parameters. Input data is the information entered into the program as well as the structure of the data. In one embodiment of the present disclosure, input data is a list of numerical values. Output data is the resulting processed data. In yet another embodiment of the present disclosure, output data is a list of values sorted in ascending order. The function logic refers to the task or operation to be performed by the software program to convert the input data to the output data. In one embodiment of the present disclosure, the function logic is an algorithm to sort numbers in ascending order. The software configuration parameters include, but are not limited to, programming language, operating system to run with, software running speed, software size in kilobytes, deployment environment, real-time requirements, etc. In one embodiment of the present disclosure, the parameters include a requirement of Python programming language for an iOS mobile app (deployment environment).

Once the new function's specifications are entered as a part of a search query, the search engine or search engine programming API calls will look for relevant snippets, text, libraries, or machine code on the Internet (106). In one embodiment of the present disclosure, the search engine used is Google. The snippets can be available from channels or sources including, but not limited to, developers' blog sites, academic websites, instructional or reference portals, open source software development hosting services such as GitHub, bitbucket, and forums such as Stack Overflow. Each channel may have different hosting formats of the source codes. However, the format specifications and API syntaxes can always be available and used to programmatically extract the source codes. For example, stackoverflow.com uses fenced code blocks, by surrounding the software code with "'", or with ~~~ (the opening and closing fence have to be on their own lines, and can be indented with up to three spaces; more than three backticks or tildes can be used, as long as the closing fence uses the same character and is at least as long as the opening fence.

After the searching (104) in one alternative embodiment of the general method workflow, the snippets (106) that match the specifications (102) may be analyzed and ranked in (108). In yet another embodiment of the present disclosure, the search results are ranked by how closely they match the search query, expressed as a percentage, number of occurrences of the keywords matching divided by total number of words in the search result, e.g. 16% of the words match the keywords. The higher the percentage of matching, the higher rank the URL (Universal Resource Link) will be. The analysis and ranking can be done automatically or semi-automatically; sometimes, human intervention may be involved.

In an alternative embodiment of the general method workflow, the snippets source codes are first selected and then extracted from the search results in the block (110). This is after or without the analysis and ranking (108). In one exemplary embodiment of the present disclosure, the search results are selected by picking the highest-ranking if the ranking (108) is used or simply picking the first searched result if the ranking (108) is not used. In yet another embodiment of the present disclosure, the selected result is extracted through a method of looking for the fenced code blocks, such as surrounding the software code with "'" (three back quotes), or with ~~~ (three tildes). The opening and closing fence have to be on their own lines, and can be indented with up to three spaces as in the stackoverflow.com. The selection and extraction can be done automatically or semi-automatically; sometimes, human intervention may be involved.

In an alternative embodiment of the general method workflow, the snippets source codes are refactored and reformatted in the block (112). This is after the selecting and extracting (110). However, in another embodiment of the present disclosure, the refactoring and reformatting may be omitted. In one exemplary embodiment of the present disclosure, the code snippet is refactored by matching variable names to those in the previous software code. In another embodiment of the present disclosure, the code snippet is reformatted by indenting lines in the same pattern as that of the existing software code to match the existing programming style. The refactoring and reformatting can be done automatically or semi-automatically; sometimes, human intervention may be involved.

In an alternative embodiment of the general method workflow, the snippets source codes are glued and tested in the block (114). This is after or without the refactoring and reformatting (112). However, in another embodiment of the present disclosure, the gluing and testing may be omitted. In one embodiment of the present disclosure, the new snippets are firstly chained according to the functions, then integrated by merging into the existing source code and the gaps between the snippets and the source codes are filled by matching the input variable names of the second snippet to the output variable names of the first snippet or the existing source code. The final source code testing is done by automatically generated test cases. There are already many automatic software test case generators on the market. The gluing and testing (114) can be done automatically or semi-automatically; sometimes, human intervention may be involved.

The method is complete when the updated software source code is outputted in the block (116). The existing software is now added with the new codes of the new function(s). The new software should meet all the requirements specified in the block (102).

Figure 2:
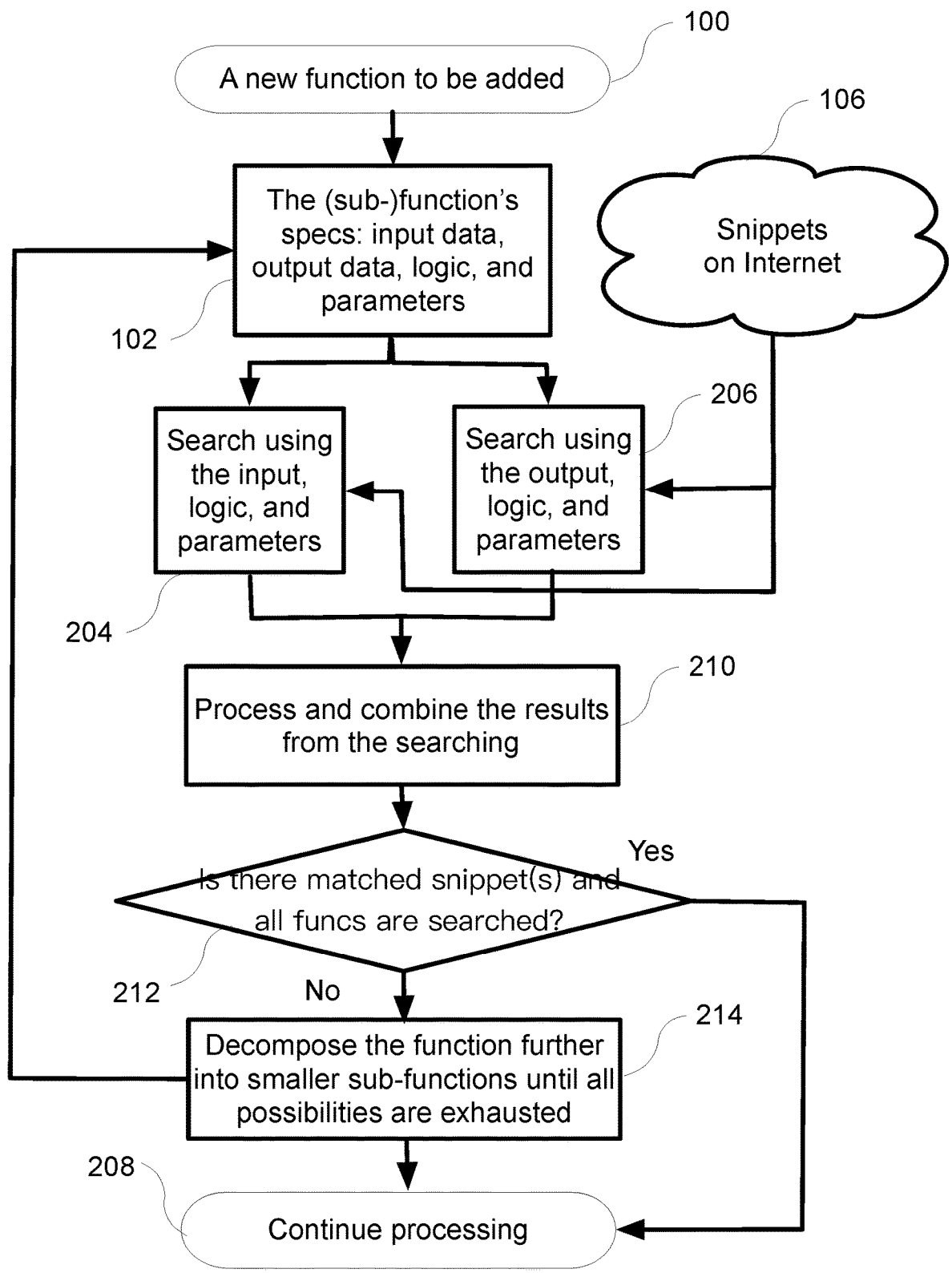
FIG. 2 illustrates a preferred embodiment of the searching and function decomposition methods of the present disclosure.

FIG. 2 illustrates a preferred embodiment of the searching and function decomposition methods of the present disclosure. In this embodiment of the present disclosure, the whole diagram of FIG. 2 replaces the blocks (100), (102), (104), and (106) in FIG. 1. It illustrates further on how the snippet search can be done in detail.

The method still starts from adding a new function (100). When it is the first time entering the block (102), a set of user-inputted specifications of the new function (100) is provided. The specifications including, but not limited to, input and output data, logic, and parameters (102); are used to perform two searches for relevant snippets on the Internet (106): the first search (204) using the input data, logic, and parameters; the second search (206) using the output data, logic, and parameters. The first (204) and second search (206) are both searching for snippets from the Internet (106) and using similar search engines or their APIs.

The returned search results, including programming examples, snippets, and reference articles or usage examples explaining its principle and how it can be used, are processed and combined in (210). In one simple embodiment of the present disclosure, if the first search (204) yields a first list of URLs where the example source codes match the input data, function logic and the parameters; the second search (206) yields a second list of URLs where the example source codes match the output data, function logic and the parameters, then both the first and second list are combined together (210) to form the final search results. Splitting the search into two searches instead of a single big search to match all input data, output data, function logic and the parameters provides a lot of more useful snippets to the user.

If an example snippet code only meets the input data requirement and not the output data requirement, this snippet might still be used in the generated source code provided the output data requirement is matched by automatically, semi-automatically, or manually refactoring or modifying the sample codes in the latter steps. Similarly, if an example snippet code only meets the output data requirement and not the input data requirement, this snippet might still be used in the generated source code provided the input data requirement is matched by automatically, semi-automatically, or manually refactoring or modifying the sample codes in the latter steps. If a first example snippet code only meets the input data requirement and not the output data requirement, and there is a second example snippet code that only meets the output data requirement and not the input data requirement, then the first example snippet code can be used together with the second snippet code provided necessary automatic, semi-automatic, or manual refactorization or modifications are made into the source codes.

After the processing in (210), check if at least one matching snippet is found in (212). If at least one snippet is found for each function, then the processing continues to the block (208). In one embodiment of the present disclosure, the continued processing (208) connects to the block (108) or the block (110) in FIG. 1. If no snippet can be found for the specific function, the function's logic will be further decomposed into two smaller sequential sub-functions (214). In one exemplary embodiment of the present disclosure, the original function is split into a first sub-function and a second sub-function. The decomposition (214) can be automatic, semi-automatic, or completely manual. In one exemplary automatic decomposition embodiment, the function decomposition is predicted by a pre-trained machine learning model, like a neural network or decision tree, using the previous knowledge database.

The original input data will become the input of the first sub-function. The output data of the first sub-function will be the input data of the second sub-function. The output of the second sub-function will be the original output data in the specification. After the decomposition, the first sub-function and its input and output data requirements go back to the block (102) and form a new specification of the next iteration of snippet searching. This searching process will repeat until all possibilities are exhausted. Either all the sub-functions find at least one snippet or the sub-function that does not have a snippet cannot be decomposed any further. If so, the result is reported to the user and the process stops.

Figure 3:
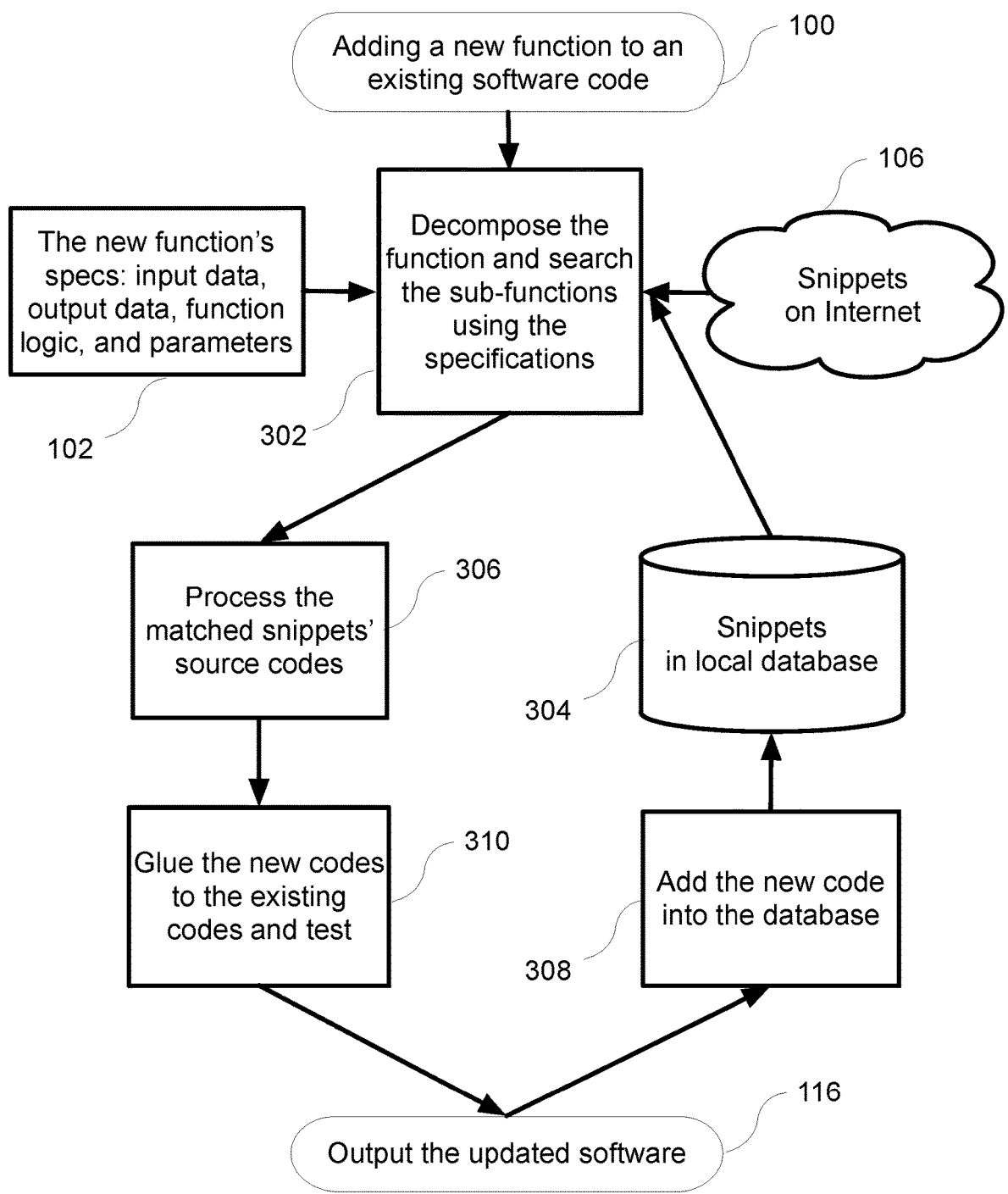
FIG. 3 illustrates a preferred embodiment of using a local snippet database in conjunction with the Internet in the present disclosure.

FIG. 3 illustrates a preferred embodiment of using a local snippet database in conjunction with the Internet in the present disclosure. When (100) adding a new function to an existing software code, the function will be searched directly for snippets using the corresponding user provided specifications: input data, output data, function logic, and parameters (102); or decomposed into sub-functions first and then searched (302) if the snippet for the function cannot be found. The searching is conducted on the snippets on the Internet (106) and a local snippet database storage (304). In one embodiment of the present disclosure, the local snippet database (304) may store a pre-loaded sample snippets database.

Once a matching snippet is found in (302), it is processed in (306). The processing (306) may include the processing steps (108), (110), and (112) previously described in FIG. 1. The processed snippets are then glued to the existing codes and tested (310) before being outputted as updated software (116). In one embodiment of the present disclosure, the gluing and testing (310) are similar to that in (114) of FIG. 1. In block (208) the new code, along with the corresponding reference articles or usage examples explaining its principle and how it can be used, is saved and added to the local snippet database (304), and all subsequent snippet searches (302) will be performed using both online archives (106) and the updated local database (304). In this way, the newly generated source code can be reused in generating a new code.

FIG. 4 illustrates an exemplary embodiment of the processing when a function cannot be fulfilled by any single snippet. A single search of the input function logic was unable to yield a matching snippet. The sample function logic and keywords of the query "python float list normalize between 0 and 1 and sort float array" (402) in FIG. 4 serve only for exemplary purpose and are not to be regarded as limited to these examples. The exemplary query, Google search engine, search return results, example function decomposition results, refactoring, and code gluing methods could have all other possible variants and should be obvious to the ordinarily skilled in the art.

First, the sample query (402) is looked up on Google search engine and in the local database (304). The query (402) is comprised of a set of keywords including the input (float list), output (float array), function logic (normalize between 0 and 1, sort), and the parameters (python language). Second, the first returned result has a title (404) that says "Normalization—How to normalize data to 0-1 range?—Cross Validated". The returned result also has a URL link (406) "https://stats.stackexchange.com/questions/70801/how-to-normalize-data-to-0-1-range". Besides this result, there are other return results as well. Similarly, each return result has a title and URL.

Third, the source code processing and combining the search results (210) may include analyzing and ranking (108) the first webpage, selecting and extracting the snippet (110) from the webpage, refactoring and reformatting the extracted code (112). The following codes can be received (408):

Example Data
x=sample(-100:100, 50)
Normalized Data
normalized=(x-min(x))/(max(x)-min(x))
Histogram of example data and normalized data
par(mfrow=c(1,2))
hist(x, breaks=10, xlab="Data", col="lightblue", main=" ")
hist(normalized, breaks=10, lab="Normalized", col="lightblue", main=" ")

From the extracted snippet code (408), one can find that it has only part of the required function logic. The snippet realizes the normalization of the input data, but does not sort the data. In one exemplary simplest embodiment of the present disclosure, one way to achieve the above automatic code function check is to search the keyword "sort" in the returned webpage including the snippet code. If the keyword "sort" does not exist in the webpage and the source codes at all, then the sorting function is unlikely to have been implemented in the codes.

A similar automatic, semi-automatic, or manual function check can be carried out in the other returned search links. For this specific search (402), there is not any searched page that contains a snippet code that implements both normalization and sorting functions. This concludes (410) that "Could not find any result that can do both normalization and sorting on a float array using python programming language".

If no snippet can be found by searching the full set of keywords or specifications of the given function, in an alternative embodiment of the present disclosure, the searching can be split into two searches as shown in FIG. 2. The first search (204) is to search using the input, function, and parameters. The 355 second search (206) is to search using the output, function, and parameters. The first and second search results are similar to the search results in the FIG. 4. They also come to the same conclusion (410) that "Could not find any result that can do both normalization and sorting on a float array using python programming language".

In yet another alternative embodiment of the present disclosure, the search can be split into two sub-functions (214) as shown in FIG. 2. The first sub-function is "normalize". The second sub-function is "sort". A first search is to search using the input, the first sub-function, and parameters. A second search is to search using the output, the second sub-function, and parameters.

FIG. 5 illustrates an exemplary embodiment of the processing when a function can be fulfilled by two such sub-searches. First, in sub-figure (a), the query (502) is looked up on Google search engine and in the local database (304). The query (502) is composed of a set of keywords including the input (float list), output (float array), the first sub-function logic (normalize between 0 and 1), and the parameters (python).

Second, the first returned result has a title (506) that says "Normalization—How to normalize data to 0-1 range?— Cross Validated". The returned result also has a URL link (508) "https://stats.stackexchange.com/questions/70801/how-to-normalize-data-to-0-1-range". Besides this result, there are other return results as well. Similarly, each return result has a title and URL.

Third, the source code processing and combining the search results (210) may include analyzing and ranking (108) the first webpage, selecting and extracting the snippet (110) from the webpage, refactoring and reformatting the extracted code (112). The following codes can be received (510):

```
Example Data
x=sample(-100:100, 50)
Normalized Data
normalized=(x-min(x))/(max(x)-min(x))
Histogram of example data and normalized data
par(mfrow=c(1,2))
hist(x, breaks=10, xlab="Data", col="lightblue", main=" ")
hist(normalized, breaks=10, lab="Normalized", col="lightblue", main=" ")
```

From the extracted snippet code (510), one can find that it has the required sub-function logic. The snippet realizes the normalization of the input data.

A similar automatic, semi-automatic, or manual function check can be carried out in the other returned search links. For this specific search (502), there is at least one searched page containing a snippet code that implements the "normalization" function. This concludes that the snippet that meets all the specifications of the first sub-function is found in (510).

In sub-figure (b), the query (512) is firstly looked up on Google search engine and in the local database (304). The query (512) is composed of a set of keywords including the output (float list), the second sub-function logic (sort), and the parameters (python).

Second, the first returned result has a title (516) that says "Python how to sort list with float values—Stack Overflow". The returned result also has a URL link (518) "https://stackoverflow.com/questions/37318637/python-how-to-sort-list-with-float-values". Besides this result, there are other return results as well. Similarly, each return result has a title and URL.

Third, the source code processing and combining the search results (210) may include analyzing and ranking (108) the first webpage, selecting and extracting the snippet (110) from the webpage, refactoring and reformatting the extracted code (112). The following codes can be received (520):

```
list1=sorted(list1, key=float)
```

From the extracted snippet code (520), one can find that it has the required sub-function logic. The snippet realizes the sorting of the input data.

A similar automatic, semi-automatic, or manual function check can be carried out in the other returned search links. For this specific search (512), there is at least one searched page containing a snippet code that implements the "sort" function. This concludes that the snippet that meets all the specifications of the second sub-function is found in (520).

FIG. 6 illustrates an exemplary embodiment of the analyzing and ranking of the searched snippets. First, a query (502) is looked up on Google search engine and in the local database (304). The query (502) is composed of a set of keywords including the output (float list), the sub-function logic (normalize), and the parameters (python) of the input specifications (102).

Second, in the sub-figure (b), the first returned search result has a title (616) that says "Normalizing a list of numbers in Python—Stack Overflow". The returned result also has a URL link (618) "https://stackoverflow.com/questions/26785354/normalizing-a-list-of-numbers-in-python". In the sub-figure (a), the second returned search result has a title (606) that says "Normalization—How to normalize data to 0-1 range?—Cross Validated". The returned result also has a URL link (608) "https://stats.stackexchange.com/questions/70801/how-to-normalize-data-to-0-1-range".

Besides the above two results, there might be other return results as well. Similarly, each return result has a title and URL or the downloaded full webpage linked by the URL.

In one embodiment of the present disclosure, after the automatic, semi-automatic, or manual analyzing and ranking, all the returned search results are re-ranked so that the second returned search result (606, 608) is ranked higher than the second returned search result (616, 618). The reason (604) that the second returned search result (606, 608) is ranked higher than the second returned search result (616, 618) is because the second result was a normalization to the range 0-1 and therefore much closer to the query. The rank can be determined by calculating a score value that measures the correlation between the search result and the query. The result with the highest rank is selected to go to the next steps.

FIG. 7 illustrates an exemplary embodiment of the extracting, refactoring, and reformatting of the two searched snippets. In one embodiment of the present disclosure, the snippet codes are extracted by looking for the so-called fenced code blocks that the software codes surrounded by "`" (three backticks), or ~~~ (three tildes). The opening and closing fence have to be on their own lines, and can be indented with up to three spaces; more than three backticks or tildes can be used, as long as the closing fence uses the same character and is at least as long as the opening fence.

After the snippets' codes are extracted, the codes may be reformatted to be clean and ready for the next processing steps. In one embodiment of the present disclosure, the code reformatting is carried out by automatic, semi-automatic, or manual detection and removal of the helper codes. The helper codes are source codes that provide sample input data or print or display the output data. The helper codes can be identified by explicit commendation, typical API function calls, the location of the source code, etc. There are also some third-party tools and libraries that can be used for the purpose.

In sub-figure (a), the query result (502) renders a returned result with a retrieved code (510):
Example Data
x=sample(−100:100, 50)
Normalized Data
normalized=(x−min(x))/(max(x)−min(x))
Histogram of example data and normalized data
par(mfrow=c(1,2))
hist(x, breaks=10, xlab="Data", col="lightblue", main=" ")
hist(normalized, breaks=10, lab="Normalized", col="lightblue", main=" ")
From the extracted snippet code (510), the code after the above refactoring and reformatting (702) can be:
Normalized Data
normalized=(x−min(x))/(max(x)−min(x))
The helper code for testing input and displaying output has been removed.

In sub-figure (b), the query (512) renders a returned result with a retrieved code (512):
list1=sorted(list1, key=float)
From the extracted snippet code (512), the code after the refactoring and reformatting (712) can be:
Sorted Data
list1=sorted(normalized, key=float)
A command line has been added to conform to the same programming style and make the codes more understandable. The variable's name has also been modified to match the variable in the previous sub-function.

FIG. 8 illustrates an exemplary embodiment of the gluing and connecting of the two searched snippets. From the results of FIG. 7, the final source code of the first sub-function (502) is (702); the final source code of the second sub-function (512) is (712). In one embodiment of the present disclosure, the two pieces of the codes are glued by simply concatenating them together. The code gluing process also includes adding any codes to fill the gap between the snippet codes. In yet another alternative embodiment of the present disclosure, the input and display helper codes are also added to make the final generated code compileable and testable. The input helper code (802) can be added at the beginning of the generated code to provide the input data according to the specifications. The output helper code (806) can be added at the end of the generated code to provide the printing or displaying of the output data according to the specifications. After the code gluing, the generated source codes are complete. The software is then compiled to the machine code and tested against the programming specifications.

FIG. 9 illustrates an exemplary embodiment of the archiving and indexing of the newly generated code into the local snippet database for further use. After the newly generated source codes (904) have been tested successfully, it becomes a new snippet source code and is ready to be put into the local snippet database (304). A new tag or title (902) will be also generated based on the specifications (102). The new tag generated in the exemplary embodiment is "python float list normalize between 0 and 1 and sort float array". The new tag, and the reference articles or usage examples explaining its principle and how it can be used, will be also put into the local snippet database (304) for indexing the generated codes (904). If a future search of snippets retrieves this piece of code, the returned title will be the tag (902). The returned URL will be the actual local access link path to the record of this snippet in the local database (304), and the returned and extracted snippet source code will be (904).

Figure 10:
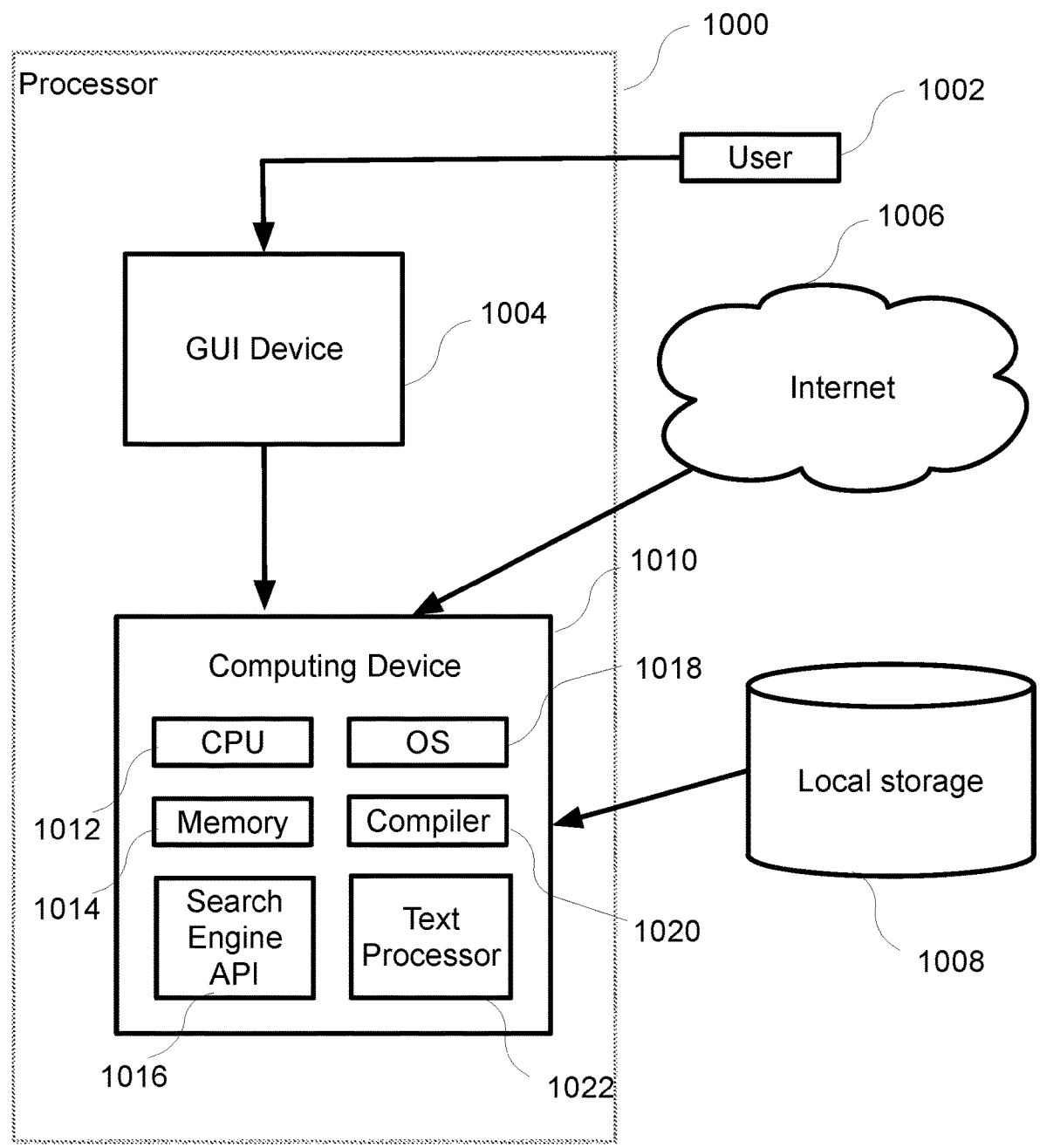
FIG. 10 illustrates an exemplary embodiment of the apparatus that implements the methods of the present disclosure.

FIG. 10 illustrates an exemplary embodiment of the apparatus that implements the methods of the present disclosure. A data processor unit (1000) interfaces with a user (1002) and has access to the Internet (1006) and a local storage (1008). The local storage (1008) could be a cluster, a NAS (network attached storage), or simply an external or internal hard disk drive. The processor unit (1000) contains a GUI (graphic user interface) device (1004) and general computing device (1010). The GUI device can be a computer monitor, digital projector, or TV. The general computing device (1010) can be a desktop computer, laptop, rack mounted blade server, super-computer, etc. The computing device (1010) generally may contain one or more CPUs (centre processing unit) (1012), a memory (1014), hardware, etc.; as well as an OS (operating system) (1018), compiler (1020), search engine API (1016), text processor (1022), etc. The compiler (1020) is used to compile the desired source code into machine binary code. The search engine API (1016) is used to programmatically search and retrieve the information from the Internet (1006). The text processor (1022) is used to read, parse, and understand the text information from both the Internet and local storage.

A user (1002) operates the processor unit (1000) through the GPU device (1004). The user provides the desired specifications for his/her target source code. The computing device (1010) installs and runs a software program that implements the source code generation methods described in the present disclosure. The software program may be called a code generator. The code generator is running in the CPU, memory and OS environment. The code generator looks for the external snippets from the Internet (1006) and the local storage database (1008) by using the search engine API (application program interface) (1016). The code generator also uses a text processor module (1022) to analyze, understand, and process the searched results or snippet codes. The code generator also uses a compiler (1020) to compile the generated code for testing the correctness.

The apparatus design described here will serve for exemplary purpose but is not to be regarded as limited to it. The other designs obvious to the ordinarily skilled in the art are also covered by the present disclosure. For example, each module or component can be realized through hardware or software or mixed hardware and software methods. Each module or component can also be connected locally or remotely.

The invention claimed is:

1. A method of generating a software code snippet from a list of specifications, comprising:
   analyzing the input specifications;
      wherein the specifications include a function logic to achieve, input and output data, and parameters of the software;
      wherein the parameters include at least a programming language, operating environment, software size, data structure, running performance, and deployment conditions of the software;
   determining a plurality of keywords representing the specifications;
   searching the keywords in a local database and on the Internet;
      wherein the local database includes previously generated code snippets;

wherein the search returns a plurality of search results from a plurality of sources including websites and/or local database records;
collecting and pre-processing the plurality of search results;
　　wherein each of the search results contain an example snippet and/or associated reference text and usage example if any;
　　wherein the pre-processing method is varied according to the sources;
analyzing and ranking each of the search results;
　　wherein the ranking process brings the best matching example snippet to the first position;
selecting and extracting the example snippet from the ranked results;
refactoring and reformatting the example snippet;
adding glue codes and generating a software code snippet;
compiling and testing the generated code snippet;
going back to the ranking step to re-rank and select a different snippet if the compilation and/or test fails;
going back to the determining step to determine a different plurality of keywords for the search if the example snippets from the previous search have all been tested and failed;
storing the best generated code snippet so far into the local database;
　　wherein a new reference text and/or usage example are generated from the specifications;
　　wherein the new reference text, usage example, and associated reference text and/or usage example if any are stored along with the code snippet;
outputting the generated code snippet;
wherein searching the keywords and collecting and pre-processing the search results are automatic processes; the other steps are automatic or semi-automatic processes.

2. The method of claim 1, wherein at least one step is a manual process.

3. The method of claim 1, wherein the plurality of keywords is divided into two groups;
　　wherein the first group contains the keywords excluding the output data and the second group contains the keywords excluding the input data;
　　wherein the search results are combined search results from both a first search of the first group of keywords and a second search of the second group of keywords.

4. The method of claim 1, wherein a list of software specifications is decomposed into a first list of specifications and a second list of specifications;
　　wherein the first list of specifications includes a first sub function logic to achieve the input data, parameters, and intermediate data; wherein the first sub function takes the input data and outputs the intermediate data;
　　wherein the second list of specifications includes a second sub function logic to achieve, the intermediate data, parameters, and output data; wherein the second sub function takes the intermediate data and outputs the output data;
　　wherein the second sub function completes the first to achieve the function logic;
　　wherein the input list of specifications is the first list of specifications and the second list of specifications, respectively.

5. The method of claim 4, wherein a final generated code snippet is a combination of the code snippet generated for the first list of specifications and that for the second.

6. The method of claim 1, wherein the software code snippet is to be generated to add a new function to an existing software code base;
　　wherein the existing software code uses a similar list of parameters as that in the specifications.

7. The method of claim 1, wherein the local database includes a pre-loaded third-party sample snippets database.

8. The method of claim 1, wherein at least one automatic or semi-automatic step uses an artificial-intelligence (A.I.) based machine learning model that includes a neural network and/or decision tree.

9. The method of claim 8, wherein the artificial-intelligence model is a deep-reinforcement-learning model.

10. The method of claim 1, wherein the websites of the plurality of sources are a developer blog, academic website, portal, opensource hosting service, or forum.

11. The method of claim 1, wherein the ranking uses a method of computing a correlation score between the keywords and the search results.

12. The method of claim 1, wherein the extraction uses a method of looking for a fenced code block.

13. The method of claim 1, wherein refactoring uses a method of matching an input variable name in a current snippet to an output variable name in a previous snippet.

14. The method of claim 1, wherein the search results may include a programming example, snippet, reference article, and/or usage example.

15. The method of claim 1, wherein the local database is not used in the search.

16. The method of claim 1, wherein only the local database is used in the search.

17. An apparatus for generating a software code snippet from a user, comprising:
　　an Internet connection;
　　a local storage to store a database;
　　a user interface to receive the user' inputs for a list of specifications for the software;
　　　　wherein the specifications include a function logic to achieve, input and output data, and parameters of the software;
　　　　wherein the parameters include at least a programming language, operating environment, software size, data structure, running performance, and deployment conditions of the software;
　　a processor to generate the code snippet from the specifications automatically or semi-automatically, comprising:
　　　　determining a plurality of keywords representing the specifications;
　　　　searching the keywords in the local database and on the Internet;
　　　　　　wherein the local database includes previously generated code snippets and/or a third-party snippets database;
　　　　　　wherein the search returns a plurality of search results from a plurality of sources including websites and/or local database records;
　　　　collecting and pre-processing the plurality of search results;
　　　　　　wherein each of the search results contain an example snippet and/or associated reference text, usage example if any;
　　　　　　wherein the pre-processing method is varied according to the sources;
　　　　analyzing and ranking each of the search results;
　　　　　　wherein the ranking process brings the best matching example snippet to the first position;

selecting and extracting the example snippet from the ranked results;
refactoring and reformatting the example snippet;
adding glue codes and generating a software code snippet;
compiling and testing the generated code snippet;
going back to the ranking step to re-rank and select a different snippet if the compilation and/or test fails;
going back to the determining step to determine a different plurality of keywords for the search if the example snippets from the previous search have all been tested and failed;
storing the best generated code snippet so far into the local database;
   wherein a new reference text and/or usage example are generated from the specifications;
   wherein the new reference text, usage example, and the associated reference text and/or usage example if any are stored along with the code snippet;
outputting the generated code snippet.

18. The apparatus of claim 17, wherein at least one of the processor's steps is a manual process;
wherein the processor comprises at least a user interfacing and computing device;
wherein the computing device comprises at least a CPU, memory, operating system, compiler, search engine API, and text processor.

19. The apparatus of claim 17, wherein the plurality of keywords is divided into two groups;
   wherein the first group contains the keywords excluding the output data and the second group contains the keywords excluding the input data;
   wherein the search results are combined search results from both a first search of the first group of keywords and a second search of the second group of keywords.

20. The apparatus of claim 17, wherein the list of software specifications is decomposed into a first list of specifications and a second list of specifications;
   wherein the first list of specifications includes a first sub function logic to achieve, the input data, parameters, and intermediate data; wherein the first sub function takes the input data and outputs the intermediate data;
   wherein the second list of specifications includes a second sub function logic to achieve, the intermediate data, parameters, and output data; wherein the second sub function takes the intermediate data and outputs the output data;
   wherein the second sub function completes the first to achieve the function logic;
   wherein the input list of specifications is the first list of specifications and the second list of specifications, respectively;
a final generated code snippet is a combination of the code snippet generated for the first list of specifications and that for the second.

* * * * *